United States Patent Office 2,723,185
Patented Nov. 8, 1955

2,723,185

PRODUCTION OF DICYAN

Hans Huemer, Frankfurt am Main, Germany, assignor to Deutsche Gold- und Silber-Scheideanstalt Vormals Roessler, Frankfurt am Main, Germany No Drawing. Application March 22, 1954, Serial No. 417,944

Claims priority, application Germany March 28, 1953

6 Claims. (Cl. 23—151)

The present invention relates to an improved process for the production of dicyan (CN—CN).

It is already known that dicyan can be produced by heating cyanides, such as, for example, silver cyanide or mercury cyanide, whereby dicyan and the corresponding free metal is formed. A further process has also been suggested in which copper sulfate is reacted with potassium cyanide in aqueous solution to form cupric cyanide, which upon moderate heating to about 60° C. is converted to cuprous cyanide with evolution of dicyan. The prior processes however, were not suited for the production of dicyan upon a commercial scale and above all were not suited for continuous operation.

It has now unexpectedly been found, according to the invention, that dicyan can be produced in good yield by reacting cyanogen chloride with unsaturated hydrocarbons in the presence of metal chlorides, which act catalytically as chlorine transferrers. Good results have, for example, been obtained reacting cyanogen chloride with ethylene at temperatures over 150° C., preferably over 200° C.

Cuprous chloride has been found especially suitable for use as the catalyst serving as a chlorine transferring agent for the reaction according to the invention. However, other metal chlorides, such as, for example, ferrous chloride or the chlorides of antimony, vanadium and the like, can also be employed. However, in selecting a metal chloride, care should be taken that it does not have too high a vapor pressure under the conditions of the reaction.

According to a preferred modification of the process, according to the invention, the catalyst employed is supported on a suitable carrier. The usual catalyst carriers can be employed as long as they are compatible with cyanogen chloride. For example, silica gel, pumice, wood charcoal, active carbon and the like have been found suitable. The best results were obtained when active carbon was employed as the catalyst carrier and of these, it was found that a steam activated active carbon was employed as the catalyst carrier and of these, it was found that a steam activated active carbon (Supersorbon WS IV) gave especially good results.

When cyanogen chloride is reacted with an unsaturated hydrocarbon in the process, according to the invention, the corresponding chlorine addition product of the unsaturated hydrocarbon is produced in addition to the dicyan. For example, when cyanogen chloride is reacted with ethylene at a temperature between 200 and 250° C. in the presence of cuprous chloride supported on active carbon, dicyan and ethylene dichloride are obtained in almost quantitive yields. When the temperature of the reaction is raised to over 300° C., but otherwise using the same reaction conditions, vinyl chloride and hydrogen chloride are obtained in increasing quantities.

The process according to the invention can be carried out continuously without difficulty. The catalyst can be replaced from time to time depending upon its effective life or it can also be passed continuously through the reaction space at a rate such as to assure the presence of an active catalyst at all times.

The dicyan can be recovered from the reaction mixture in a simple manner by fractional condensation, whereby the ethylene dichloride and cyanogen chloride condense before the dicyan condenses, whereas small quantities of ethylene and any HCl formed remain in the vapor phase.

The dicyan produced according to the invention, has substantial and varied utility in organic synthesis in view of its behavior which is similar to that of halogen.

The following example will serve to illustrate the manner in which the process according to the invention can be carried out.

Example 30 liters of cyanogen chloride gas and 90 liters of ethylene were passed per hour through a stainless steel reaction tube having an interior diameter of 35 mm. and containing 500 cc. of a catalyst prepared by impregnating shaped steam activated active carbon with a saturated solution of 24 g. of cuprous chloride in concentrated HCl. The temperature of the catalyst was maintained at 200–250° C. By sharply cooling the reaction gas mixture to —70° C., a mixture of ethylene dichloride and dicyan in which a small quantity of ethylene was dissolved was obtained and by rectifying this mixture pure dicyan and ethylene dichloride were obtained in yields of about 70%.

I claim:

1. A process for the production of dicyan which comprises reacting cyanogen chloride in the gas phase with an unsaturated aliphatic hydrocarbon at temperatures over 150° C. in the presence of a metal chloride as a catalyst for the reaction.

2. A process for the production of dicyan which comprises reacting cyanogen chloride in the gas phase with an unsaturated aliphatic hydrocarbon at temperatures over 150° C. in the presence of a supported metal chloride catalyst.

3. A process for the production of dicyan which comprises reacting cyanogen chloride with ethylene at temperatures over 150° C. in the presence of a supported metal chloride catalyst.

4. A process for the production of dicyan which comprises reacting cyanogen chloride with ethylene at temperatures between 200 and 250° C. in the presence of a supported metal chloride catalyst.

5. A process for the production of dicyan which comprises reacting cyanogen chloride with ethylene at temperatures above 150° C. in the presence of cuprous chloride.

6. A process for the production of dicyan which comprises reacting cyanogen chloride with ethylene at temperatures between 200 and 250° C. in the presence of cuprous chloride supported on steam activated active carbon.

References Cited in the file of this patent

UNITED STATES PATENTS 2,399,361    Lacy ------------------ Apr. 30, 1946

OTHER REFERENCES

Mooney and Reid, "The Surface Reactions Between Ethylene and Halogens," Chemical Society Journal, 1931, pages 2604–2605.

Migrdichian, "The Chemistry of Organic Cyanogen Compounds," page 112, Reinhold Publ. Co., 1947.